United States Patent
Hayakawa et al.

(10) Patent No.: US 12,291,275 B2
(45) Date of Patent: May 6, 2025

(54) VEHICLE BODY LOWER STRUCTURE

(71) Applicant: HONDA MOTOR CO., LTD., Tokyo (JP)

(72) Inventors: Hirotaka Hayakawa, Tokyo (JP); Shungo Chino, Tokyo (JP); Takashi Nitta, Tokyo (JP); Kazuya Kimura, Tokyo (JP); Shuma Yoshioka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 344 days.

(21) Appl. No.: 17/947,211

(22) Filed: Sep. 19, 2022

(65) Prior Publication Data

US 2023/0094923 A1 Mar. 30, 2023

(30) Foreign Application Priority Data

Sep. 24, 2021 (JP) .................... 2021-155787

(51) Int. Cl.
| | |
|---|---|
| *B62D 25/20* | (2006.01) |
| *B60K 1/04* | (2019.01) |
| *B62D 21/02* | (2006.01) |
| *B62D 21/15* | (2006.01) |

(52) U.S. Cl.
CPC ............ *B62D 25/20* (2013.01); *B60K 1/04* (2013.01); *B62D 21/02* (2013.01); *B62D 21/15* (2013.01); *B60K 2001/0438* (2013.01)

(58) Field of Classification Search
CPC ........ B62D 25/20; B62D 21/02; B62D 21/15; B62D 25/2027; B60K 1/04; B60K 2001/0438
See application file for complete search history.

(56) References Cited

U.S. PATENT DOCUMENTS

| | | | |
|---|---|---|---|
| 2018/0126835 A1 | 5/2018 | Saeki | |
| 2019/0081296 A1* | 3/2019 | Takahashi | ........... H01M 50/249 |
| 2020/0047808 A1 | 2/2020 | Ajisaka | |
| 2021/0339617 A1* | 11/2021 | Ohkuma | ............. H01M 50/242 |
| 2022/0314775 A1* | 10/2022 | Mukumoto | .............. B60K 1/04 |

FOREIGN PATENT DOCUMENTS

| | | |
|---|---|---|
| DE | 102010039109 | 2/2012 |
| JP | 2018-075878 | 5/2018 |
| JP | 6631472 | 1/2020 |
| JP | 2020-026159 | 2/2020 |

OTHER PUBLICATIONS

Japanese Office Action for Japanese Patent Application No. 2021-155787 dated Jun. 4, 2024.

* cited by examiner

*Primary Examiner* — Lori Lyjak
(74) *Attorney, Agent, or Firm* — Amin, Turocy & Watson, LLP

(57) ABSTRACT

A vehicle body lower structure includes a front cross member, a rear side frame, a floor panel, and a front floor frame. The front cross member is disposed in front of a battery in a vehicle. The rear side frame is connected to an end portion of the front cross member on an outward side in a vehicle width direction. The front floor frame forms a closed cross section together with the floor panel and is coupled to the end portion of the front cross member on the outward side in the vehicle width direction.

9 Claims, 11 Drawing Sheets

VEHICLE BODY LOWER STRUCTURE

CROSS-REFERENCE TO RELATED APPLICATION

This application is based upon and claims the benefit of priority from Japanese Patent Application No. 2021-155787, filed on Sep. 24, 2021, the contents of which are incorporated herein by reference.

BACKGROUND

Field of the Invention

The present disclosure relates to a vehicle body lower structure.

Background

For example, a vehicle body lower structure in which a floor panel is provided below a rear seat and the floor panel is surrounded by a skeleton portion of a vehicle body so as to form an accommodation portion is known. A power storage device is disposed in the accommodation portion. The disposed power storage device is protected by the accommodation portion.

The skeleton portion of the vehicle body is formed to have a lattice shape including left and right rear side frames which are provided on left and right sides of the power storage device in a vehicle width direction, a first cross member which is provided in front of the power storage device in a vehicle, and a second cross member which is provided behind the power storage device in the vehicle. Each of the first cross member and the second cross member extends in the vehicle width direction and is laid across the left and right rear side frames.

In addition, above the power storage device, a plurality of seat frames extend in a vehicle forward-rearward direction and are provided with a gap therebetween in the vehicle width direction. The plurality of seat frames reinforce the accommodation portion.

Accordingly, for example, it is possible to withstand a collision load input to the accommodation portion due to a collision in the vehicle forward-rearward direction with the skeleton portion of the vehicle body and the plurality of seat frames. Hereinafter, the accommodation portion may also be referred to as a battery accommodation portion (for example, refer to Japanese Patent No. 6631472).

SUMMARY

However, in the battery accommodation portion in Japanese Patent No. 6631472, there is a relatively large difference in strength and rigidity between a skeleton portion of a vehicle body and a floor panel. For this reason, when a collision load in a vehicle forward-rearward direction is input to the lattice-shaped skeleton portion in the vehicle forward-rearward direction, it is difficult to efficiently transfer the load from the skeleton portion to the floor panel due to the difference in strength and rigidity between the skeleton portion and the floor panel. Therefore, for example, it is conceivable that the battery accommodation portion be deformed to a power storage device side in the vehicle forward-rearward direction of the power storage device, and thus it is difficult to protect the power storage device with the battery accommodation portion.

As a countermeasure against this, for example, it is conceivable to reinforce the skeleton portion or the floor panel of the battery accommodation portion with a reinforcement member. However, reinforcement of the skeleton portion or the floor panel with a reinforcement member may cause increase in the number of components and increase in size, which is not preferable from a viewpoint of weight reduction of the vehicle body, for example.

An object of an aspect of the present invention is to provide, for example, a vehicle body lower structure capable of curbing deformation of a battery accommodation portion caused by a collision load input due to a collision in a vehicle forward-rearward direction without reinforcing the battery accommodation portion with a reinforcement member.

A vehicle body lower structure according to a first aspect of the present invention includes a front cross member that is disposed in front of a battery in a vehicle; and a rear side frame that is connected to an end portion of the front cross member on an outward side in a vehicle width direction and is disposed on an outward side of the battery in the vehicle width direction. The vehicle body lower structure includes a floor panel that is disposed in front of the front cross member in the vehicle; and a front floor frame that forms a closed cross section together with the floor panel and is coupled to the end portion on the outward side in the vehicle width direction.

In this manner, the front cross member is disposed in front of the battery in the vehicle. In addition, the rear side frames connected to the end portions of the front cross member on outward sides in the vehicle width direction are disposed on the outward sides of the battery in the vehicle width direction. For this reason, a battery accommodation portion is surrounded by the front cross member and the rear side frames, and the battery is accommodated in the battery accommodation portion.

In addition, the floor panel is provided in front of the front cross member in the vehicle, and the front floor frame forming a closed cross section together with the floor panel is provided. Moreover, the front floor frame is connected to the end portion of the front cross member on an outward side in the vehicle width direction. Here, the rear side frames surrounding the battery accommodation portion are also connected to the end portions of the front cross member on outward sides in the vehicle width direction.

Therefore, for example, a rear collision load (collision load) input to the rear side frame due to a rear collision can be transferred to the front floor frame via the end portion of the front cross member on the outward side in the vehicle width direction. In addition, for example, a front collision load (collision load) input to the front floor frame due to a front collision can be transferred to the rear side frame via the end portion of the front cross member on the outward side in the vehicle width direction. That is, a collision load input due to a collision in a vehicle forward-rearward direction can be smoothly transferred between the rear side frame and the front floor frame via the end portion of the front cross member on the outward side in the vehicle width direction.

For this reason, part of a collision load input due to a collision in the vehicle forward-rearward direction can be dispersed such that it is not input to the battery accommodation portion. Accordingly, the strength and the rigidity of the battery accommodation portion against a collision load can be enhanced. Therefore, for example, deformation of the battery accommodation portion caused by a collision load input due to a collision in the vehicle forward-rearward direction can be curbed without reinforcing the battery accommodation portion with a reinforcement member. As a result, the battery can be protected by curbing damage to the battery with the battery accommodation portion, and thus weight reduction of a vehicle body can be achieved.

According to a second aspect, the front cross member may include an upper cross member which forms an upper portion of the front cross member, and a lower cross member which is connected to the upper cross member and forms a lower portion of the front cross member. The lower cross member may include a lower central portion which forms a central portion in the vehicle width direction, and an extension portion which is connected to an end portion of the lower central portion and forms a lower end portion on the outward side in the vehicle width direction. The rear side frame and the front floor frame may be coupled to the extension portion.

In this manner, the extension portion of the lower cross member is formed separately from the lower central portion, and the front floor frame and the rear side frame are coupled to the extension portion which is formed separately.

Accordingly, a collision load input due to a collision in the vehicle forward-rearward direction can be smoothly transferred between the rear side frame and the front floor frame via the extension portion.

According to a third aspect, the front cross member may include a first closed cross section portion formed to have a closed cross section by an upper cross member which forms an upper portion of the front cross member and a lower cross member which is connected to the upper cross member and forms a lower portion of the front cross member. The rear side frame may include a second closed cross section portion which abuts the first closed cross section portion and is formed to have a closed cross section extending in a vehicle forward-rearward direction. The front floor frame may be connected in a state of being sandwiched between the upper cross member and the lower cross member.

In this manner, the second closed cross section portion of the rear side frame abuts the first closed cross section portion of the front cross member. In addition, the front floor frame is sandwiched between the upper cross member and the lower cross member. Here, the front floor frame forms a third closed cross section portion together with the floor panel.

For this reason, the third closed cross section portion of the front floor frame and the second closed cross section portion of the rear side frame can be continuously connected via the first closed cross section portion of the front cross member. Accordingly, a collision load input due to a collision in the vehicle forward-rearward direction can be smoothly transferred between the rear side frame and the front floor frame via the first closed cross section portion of the front cross member.

According to a fourth aspect, the front cross member may include a cross central portion in which an upper central portion forming a central portion of the upper cross member in the vehicle width direction and the lower central portion are connected to each other, and a wide width portion in which an upper end portion on the outward side in the vehicle width direction formed in an end portion of the upper central portion and the extension portion are connected to each other. The wide width portion may include an inclined portion which is formed to have a wider longitudinal width in a vehicle forward-rearward direction than a longitudinal width of the cross central portion and is inclined to a rear side of the vehicle from the cross central portion toward the outward side in the vehicle width direction.

In this manner, the wide width portion of the front cross member is formed to have a wider longitudinal width than that of the cross central portion. Moreover, the inclined portion of the wide width portion is inclined to the rear side of the vehicle from the cross central portion toward the outward side in the vehicle width direction. For this reason, a collision load input due to a collision in the vehicle forward-rearward direction can be smoothly transferred between the rear side frame and the front floor frame via the inclined portion.

In addition, a rear collision load (collision load) input due to a rear collision on the rear side of the vehicle can be smoothly transferred from the rear side frame to the cross central portion of the front cross member via the inclined portion.

In addition, a large cross-sectional area of the wide width portion can be secured by setting the width of the wide width portion to be wider than that of the cross central portion. For this reason, an absorbed amount of collision energy due to a collision load can be increased by causing the wide width portion to be suitably deformed due to the collision load.

Therefore, a collision load input due to a collision in the vehicle forward-rearward direction can be smoothly transferred via the inclined portion. Moreover, the absorbed amount of collision energy can be increased by causing the wide width portion to be suitably deformed. Accordingly, the battery can be protected by curbing damage to the battery.

According to a fifth aspect, the wide width portion may include a wide width closed cross section portion which is formed to have a closed cross section inclined to a rear side of the vehicle in a vehicle upward direction in a side view.

According to this constitution, the wide width closed cross section portion of the wide width portions is inclined to the rear side of the vehicle in the vehicle upward direction. Accordingly, a collision load input due to a collision in the vehicle forward-rearward direction can be smoothly transferred between the rear side frame and the front floor frame via the wide width closed cross section portion of the wide width portion.

In addition, the wide width closed cross section portion of the wide width portion can be suitably deformed to a front side of the vehicle due to a collision load input due to a collision in the vehicle forward-rearward direction by causing the wide width closed cross section portion of the wide width portion to be inclined. For this reason, the absorbed amount of collision energy can be increased.

In this manner, a collision load input due to a collision in the vehicle forward-rearward direction can be smoothly transferred via the wide width closed cross section portion. Moreover, the absorbed amount of collision energy can be increased by causing the wide width closed cross section portion to be suitably deformed. Accordingly, the battery can be protected by curbing damage to the battery.

According to a sixth aspect, the front floor frame may be disposed at a position overlapping the inclined portion in the vehicle width direction when viewed in the vehicle forward-rearward direction.

In this manner, the front floor frame is disposed at a position overlapping the inclined portion in the vehicle width direction. For this reason, for example, a rear collision load (collision load) input due to a rear collision on the rear side of the vehicle can be smoothly transferred from the rear side frame to the front floor frame via the inclined portion. In addition, for example, a front collision load (collision load) input due to a front collision on the front side of the vehicle can be smoothly transferred from the front floor frame to the rear side frame via the inclined portion. That is, a collision load input due to a collision in the vehicle forward-rearward direction can be smoothly transferred between the rear side frame and the front floor frame via the inclined portion.

Therefore, the strength and the rigidity of the battery accommodation portion against a collision load can be enhanced, and deformation of the battery accommodation portion caused by a collision load input due to a collision in the vehicle forward-rearward direction can be curbed. Thus, the battery can be protected by curbing damage to the battery with the battery accommodation portion.

According to a seventh aspect, the front floor frame may be disposed on the outward side of the battery in the vehicle width direction.

In this manner, the front floor frame is disposed on the outward side of the battery in the vehicle width direction. For this reason, the front floor frame can be located close to the rear side frame in the vehicle width direction. Accordingly, a collision load input due to a collision in the vehicle forward-rearward direction can be smoothly transferred between the rear side frame and the front floor frame.

In addition, the front floor frame can be disposed at a position not overlapping the battery in the vehicle width direction by disposing the front floor frame on the outward side of the battery in the vehicle width direction. For this reason, a collision load input due to a collision in the vehicle forward-rearward direction can be smoothly transferred between the rear side frame and the front floor frame at a position not overlapping the battery.

Thus, deformation of the battery accommodation portion can be curbed, and the battery can be protected by curbing damage to the battery.

According to an eighth aspect, the wide width portion may include a wide width overlapping portion which overlaps the rear side frame in the vehicle width direction and is set to have the widest longitudinal width.

In this manner, the wide width overlapping portion of the wide width portion is disposed so as to overlap the rear side frame in the vehicle width direction, and the wide width overlapping portion is set to have the widest longitudinal width. For this reason, for example, the wide width overlapping portion can be brought into contact with or located close to the rear side frame in the vehicle forward-rearward direction. Accordingly, for example, bending (collapse) of the wide width portion to the side of the rear side frame caused by a load input from the outward side of the battery in the vehicle width direction due to a lateral collision (hereinafter, it may also be referred to as a lateral load) can be curbed by the rear side frame.

Therefore, a lateral load can be efficiently transferred to the front cross member, and the front cross member can withstand the lateral load. As a result, deformation of the battery accommodation portion due to a lateral load can be curbed, and the battery can be protected by curbing damage to the battery.

Moreover, for example, even when an excessive lateral load is input due to a lateral collision, collapse of the wide width portion to the side of the rear side frame due to the lateral load can be curbed by the rear side frame. For this reason, an excessive lateral load can be efficiently transferred to the front cross member. In addition, impact energy due to an excessive lateral load can also be absorbed by causing the wide width portion (particularly, the wide width overlapping portion) to be suitably deformed due to the excessive lateral load. Accordingly, deformation of the battery accommodation portion due to an excessive lateral load can be curbed, and the battery can be protected by curbing damage to the battery.

According to a ninth aspect, the vehicle body lower structure may include a rear cross member that is disposed behind the battery and is coupled to the rear side frame; and a battery cover that is connected to the rear cross member and the front cross member and covers an upper portion of the battery. The battery cover may be formed of a metal.

In this manner, the battery cover covering the upper portion of the battery is formed of a metal. Since the battery cover is formed of a metal, the strength and the rigidity of the battery cover can be enhanced. This battery cover is connected to the rear cross member and the front cross member. For this reason, the rear cross member and the front cross member can be reinforced by the battery cover.

Accordingly, for example, it is possible to withstand a lateral load with the battery cover, the rear cross member, and the front cross member by dispersing the lateral load throughout each of the members. Therefore, deformation of the battery accommodation portion due to a lateral load can be curbed, and the battery can be protected by curbing damage to the battery.

According to the aspect of the present invention, for example, it is possible to curb deformation of a battery accommodation portion caused by a collision load input due to a collision in a vehicle forward-rearward direction without reinforcing the battery accommodation portion with a reinforcement member.

DESCRIPTION OF EMBODIMENTS

Figure 1:
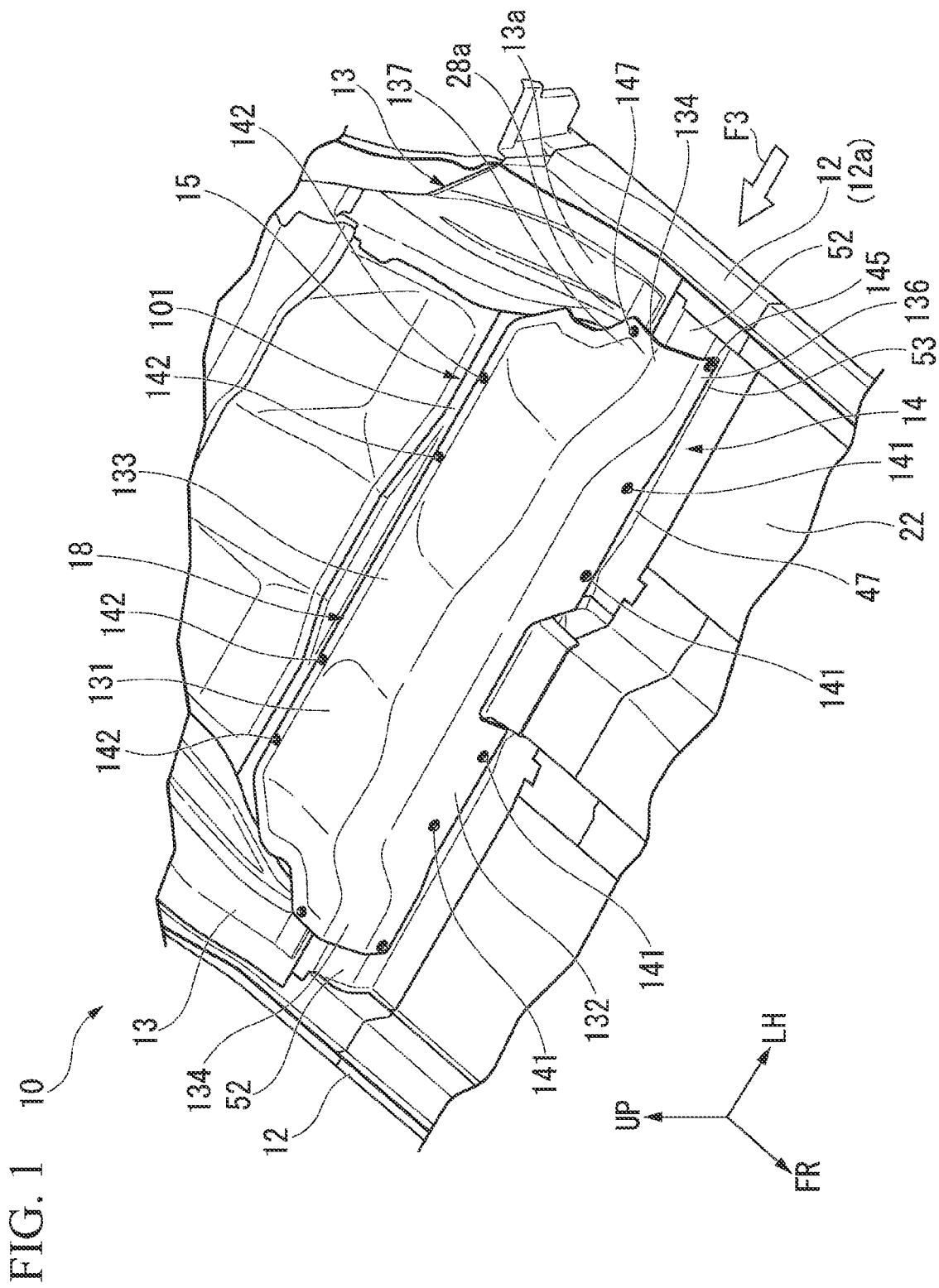
FIG. 1 is a perspective view of a vehicle body lower structure according to an embodiment of the present invention.

Hereinafter, a vehicle body lower structure according to an embodiment of the present invention will be described on the basis of the drawings. In the drawings, the arrow FR indicates the front side of a vehicle, the arrow UP indicates the upper side of the vehicle, and the arrow LH indicates the left side of the vehicle. In the embodiment, as an example, an example in which a vehicle body lower structure is applied to an electric vehicle such as a hybrid vehicle including an electric motor for traveling will be described. However, the present invention is not limited thereto, and the vehicle body lower structure can also be applied to various other automobiles.

The vehicle body lower structure has substantially a bilaterally symmetrical constitution. The same reference sign is applied to each constituent member on the left side and each constituent member on the right side, and detailed description of each constituent member on the right side will be omitted.

<Vehicle Body Lower Structure>

Figure 2:
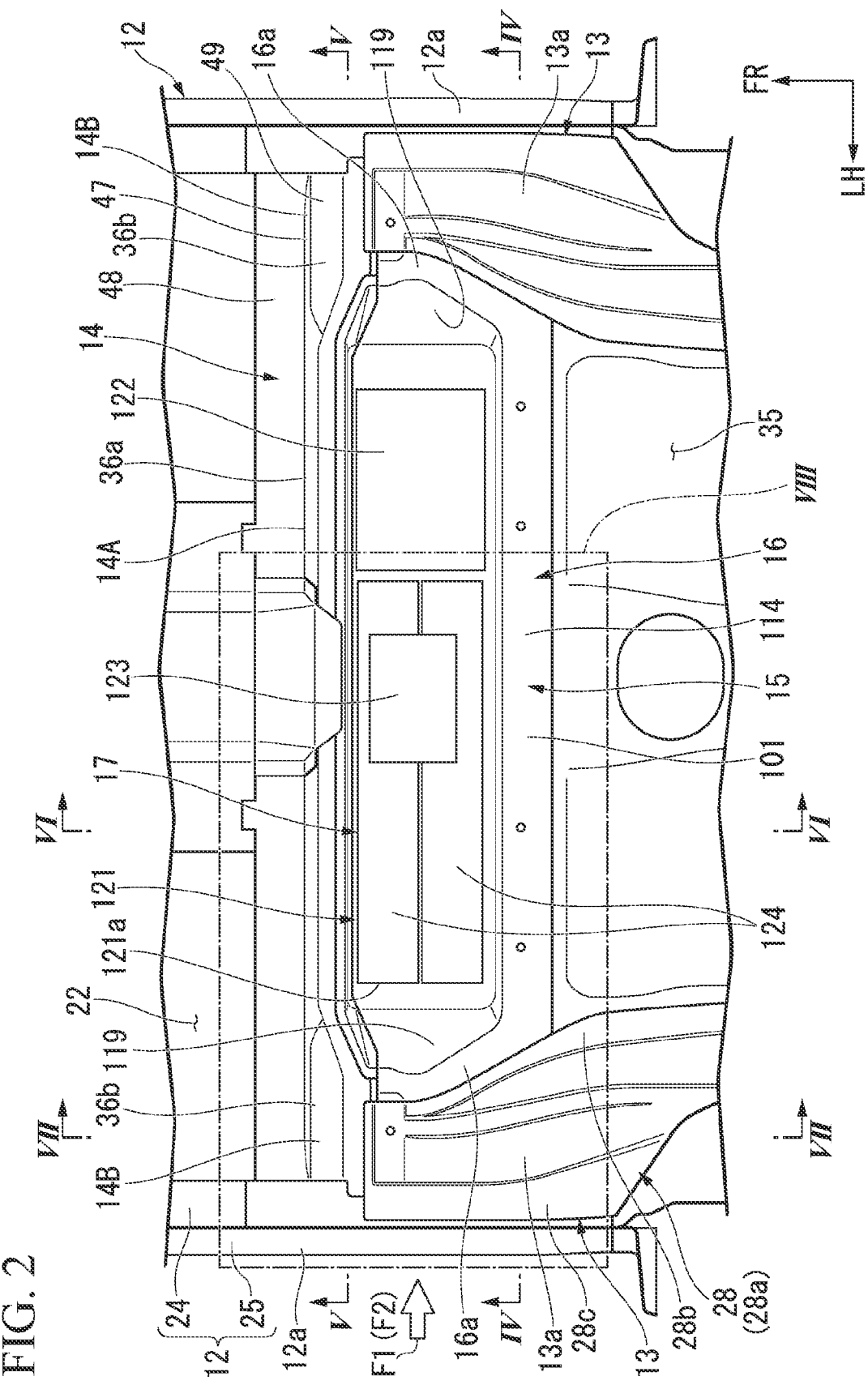
FIG. 2 is a plan view of the vehicle body lower structure according to the embodiment of the present invention.
Figure 3:
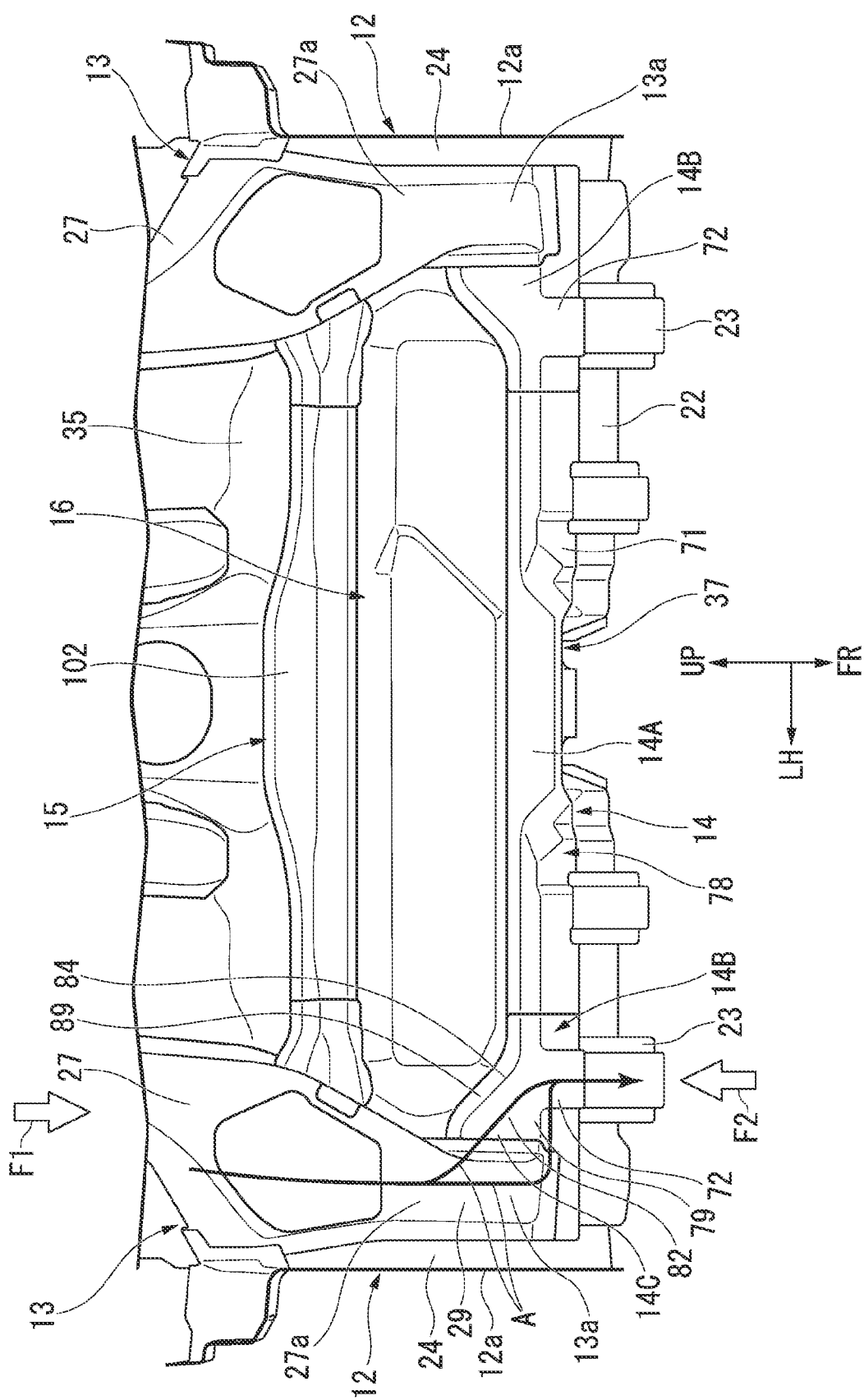
FIG. 3 is a rear view of the vehicle body lower structure according to the embodiment of the present invention viewed from a lower side on a rear side of a vehicle.

As illustrated in FIGS. 1 to 3, for example, a vehicle body lower structure 10 includes left and right side sills 12, a front floor panel (floor panel) 22, left and right rear side frames 13 which are disposed on inward sides of the side sills 12 in a vehicle width direction, a first floor cross member (front cross member) 14, a second floor cross member (rear cross member) 15 which is disposed behind the first floor cross member 14 in the vehicle, a battery accommodation portion (accommodation portion) 16 which is disposed between the first floor cross member 14 and the second floor cross member 15 and on the inward side of the rear side frames 13 in the vehicle width direction, a power storage device 17, a battery cover 18, and left and right front floor frames 23 which are disposed in front of the first floor cross member 14 in the vehicle.

Hereinafter, the left side sill 12 may be abbreviated to "a side sill 12", and the left rear side frame 13 may also be abbreviated to "a rear side frame 13". In addition, the left front floor frame 23 may also be abbreviated to "a front floor frame 23".

<Side Sill and Front Floor Panel>

Figure 4:
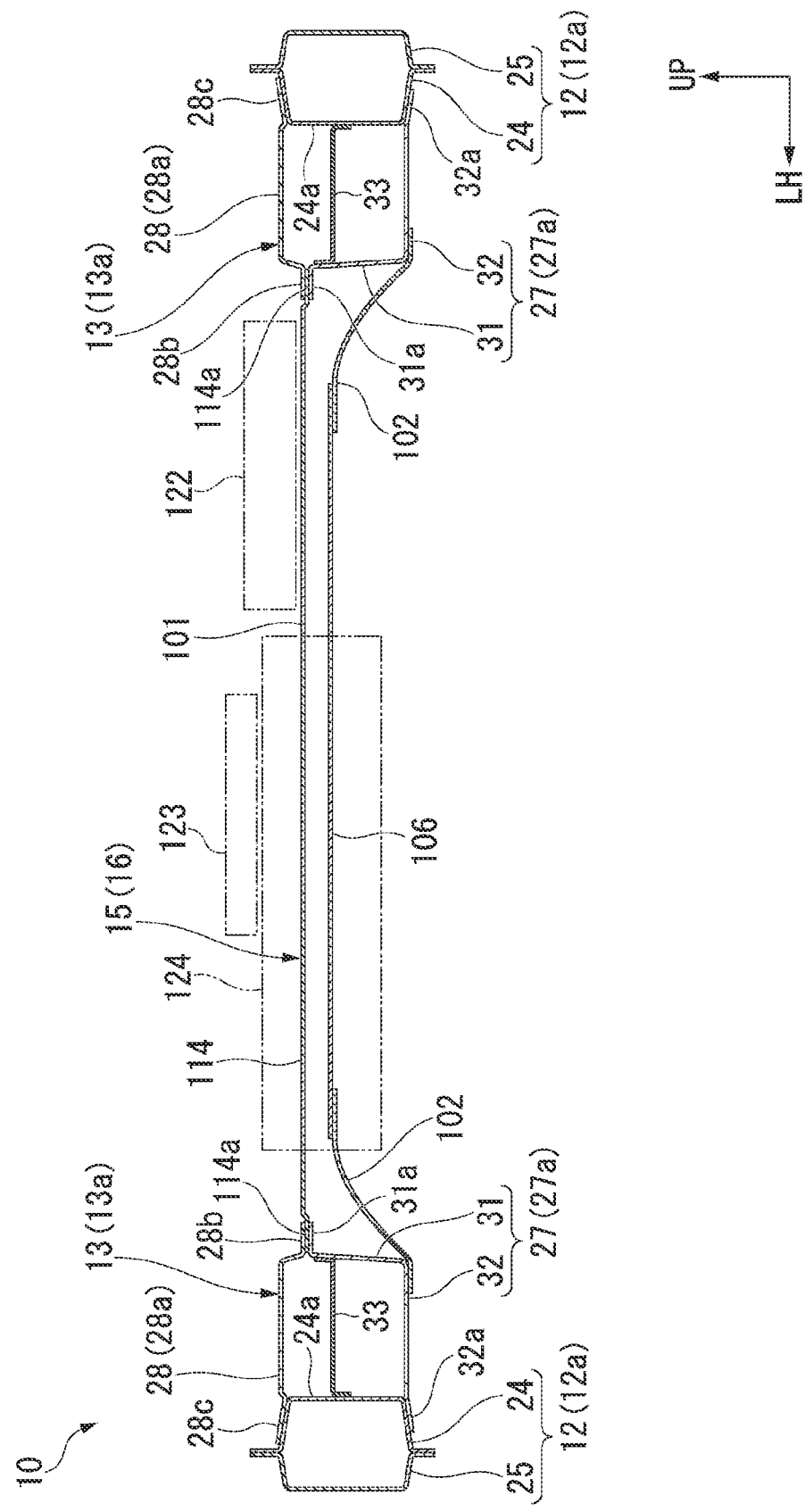
FIG. 4 is a cross-sectional view cut along line IV-IV in FIG. 2.

As illustrated in FIGS. 2 to 4, for example, the side sill 12 extends in a vehicle forward-rearward direction on an outward side in the vehicle width direction with respect to the front floor panel 22. For example, the side sill 12 is a member formed to have a rectangular closed cross section by an inner side sill 24 and an outer side sill 25, constituting a vehicle body skeleton, and having high strength and rigidity.

The front floor panel 22 is provided between the left side sill 12 and the right side sill 12. A rear end portion of the front floor panel 22 is connected to the first floor cross member 14, which will be described below. The front floor panel 22 is provided (disposed) on the front side of the vehicle with respect to the first floor cross member 14. The front floor panel 22 forms a floor surface of a vehicle compartment.

The rear side frame 13 is connected to a rear end portion 12a of the side sill 12.

<Rear Side Frame>

In the rear side frame 13, a front end portion 13a is connected to the rear end portion 12a of the side sill 12 from the inward side in the vehicle width direction. Hereinafter, the front end portion 13a of the rear side frame 13 may also be referred to as "a frame front end portion 13a". The rear side frame 13 is provided on the outward side in the vehicle width direction with respect to the battery accommodation portion 16 and the second floor cross member 15 and extends to the rear side of the vehicle from the rear end portion 12a of the side sill 12. That is, in the rear side frame 13, the frame front end portion 13a is disposed along a battery module 121 on the outward side of the battery module 121 (which will be described below) in the vehicle width direction.

The rear side frame 13 includes a lower rear side frame 27 and an upper rear side frame 28 disposed in an upper portion of the lower rear side frame 27. The lower rear side frame 27 has a lower frame front end portion 27a and a lower frame main body portion (not illustrated).

The lower frame front end portion 27a is connected to the rear end portion 12a of the side sill 12 from the inward side in the vehicle width direction. The lower frame front end portion 27a is disposed on the inward side of the rear end portion 12a of the side sill 12 in the vehicle width direction, and a lower inner wall 31 and a lower bottom portion 32 are formed to have an L-shaped cross section. In the lower inner wall 31, an upper flange 31a is connected to a left accommodation end portion 16a of the battery accommodation portion 16 and a rear floor panel 35 from below.

The rear floor panel 35 is provided between the left rear side frame 13 and the right rear side frame 13. The rear floor panel 35 is connected to the second floor cross member 15 (which will be described below) and is provided on the rear side of the vehicle with respect to the second floor cross member 15. For example, the rear floor panel 35 forms a floor surface of a trunk.

In the lower bottom portion 32, an outer flange 32a is connected to a bottom portion of the inner side sill 24 from below. For this reason, the lower frame front end portion 27a (that is, the lower inner wall 31 and the lower bottom portion 32) is formed to have a U-shaped cross section together with an inner wall 24a of the inner side sill 24, in which the upper portion opens. In addition, the lower frame front end portion 27a is reinforced by a lower stiffener 33.

Moreover, the lower frame main body portion (not illustrated) is formed to have a U-shaped cross section in which the upper portion opens.

That is, the lower rear side frame 27 formed by the lower frame front end portion 27a and the lower frame main body portion is formed to have a U-shaped cross section in which the upper portion opens. In the lower rear side frame 27, the opening of the upper portion is blocked by the upper rear side frame 28.

Specifically, in the upper rear side frame 28, an inner flange 28b of an upper frame front end portion 28a (also refer to FIG. 8) is connected to the left accommodation end portion 16a of the battery accommodation portion 16 and the rear floor panel 35 from above. In addition, in the upper rear side frame 28, an outer flange 28c of the upper frame front end portion 28a (also refer to FIG. 8) is connected to an apex portion of the inner side sill 24 from above. As a result, the opening of the upper portion having a U-shaped cross section formed by the lower frame front end portion 27a and the inner wall 24a of the inner side sill 24 is blocked by the upper frame front end portion 28a.

Accordingly, a rectangular closed cross section is formed by the lower frame front end portion 27a, the inner wall 24a of the inner side sill 24, and the upper frame front end portion 28a. The lower frame front end portion 27a and the upper frame front end portion 28a form the frame front end portion 13a of the rear side frame 13. That is, in the rear side frame 13, the frame front end portion 13a is formed to have a rectangular closed cross section together with the inner wall 24a of the inner side sill 24. The upper frame front end portion 28a is connected to the first floor cross member 14 from above (refer to FIG. 7).

Moreover, the upper rear side frame 28 has an upper frame main body portion (not illustrated) extending from the rear end portion of the upper frame front end portion 28a to the rear side of the vehicle. This upper frame main body portion blocks the opening of the upper portion of the lower frame main body portion (not illustrated). Accordingly, a rectangular closed cross section is formed by the lower frame main body portion and the upper frame main body portion. The lower frame main body portion and the upper frame main body portion form a frame main body portion of the rear side frame 13. That is, in the rear side frame 13, the frame main body portion is formed to have a rectangular closed cross section.

The closed cross section formed by the frame main body portion (not illustrated) communicates with a closed cross section formed by the lower frame front end portion 27a and the inner wall 24a of the inner side sill 24. That is, the rear side frame 13 includes a second closed cross section portion 29 which is formed to have a rectangular closed cross section extending in the vehicle forward-rearward direction, constitutes the vehicle body skeleton, and has high strength and rigidity.

<First Floor Cross Member>

Figure 5:
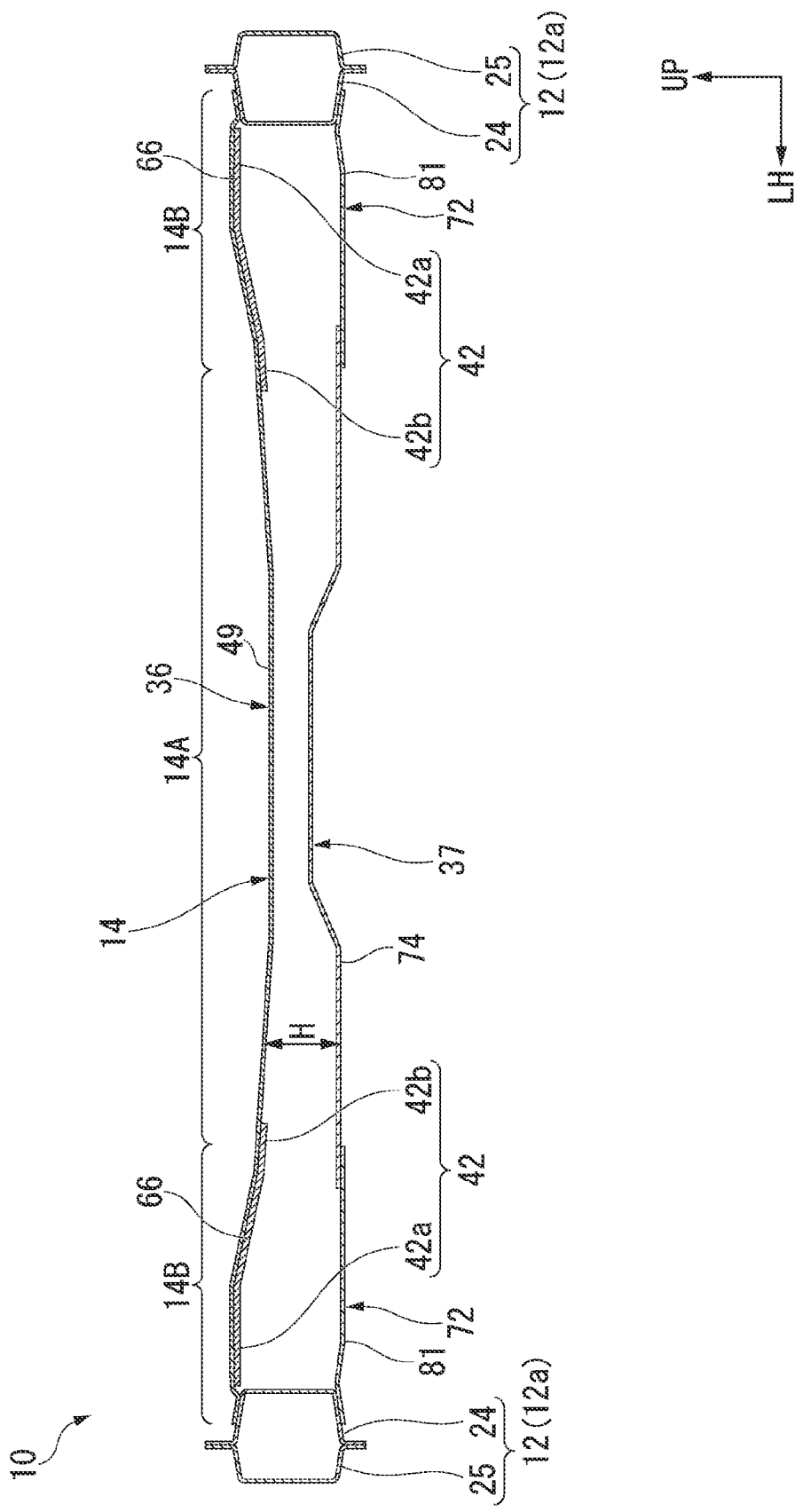
FIG. 5 is a cross-sectional view cut along line V-V in FIG. 2.

As illustrated in FIGS. 3 and 5, the first floor cross member 14 is connected (coupled) to the frame front end portion 13a of the left rear side frame 13 and the frame front end portion 13a of the right rear side frame 13. The first floor cross member 14 extends in the vehicle width direction and is laid across by being connected in a state of abutting the rear end portion 12a of the left side sill 12 and the rear end portion 12a of the right side sill 12. In addition, the first floor cross member 14 is disposed on the front side of the vehicle with respect to the battery accommodation portion 16 and the power storage device 17 (refer to FIG. 2).

Figure 6:
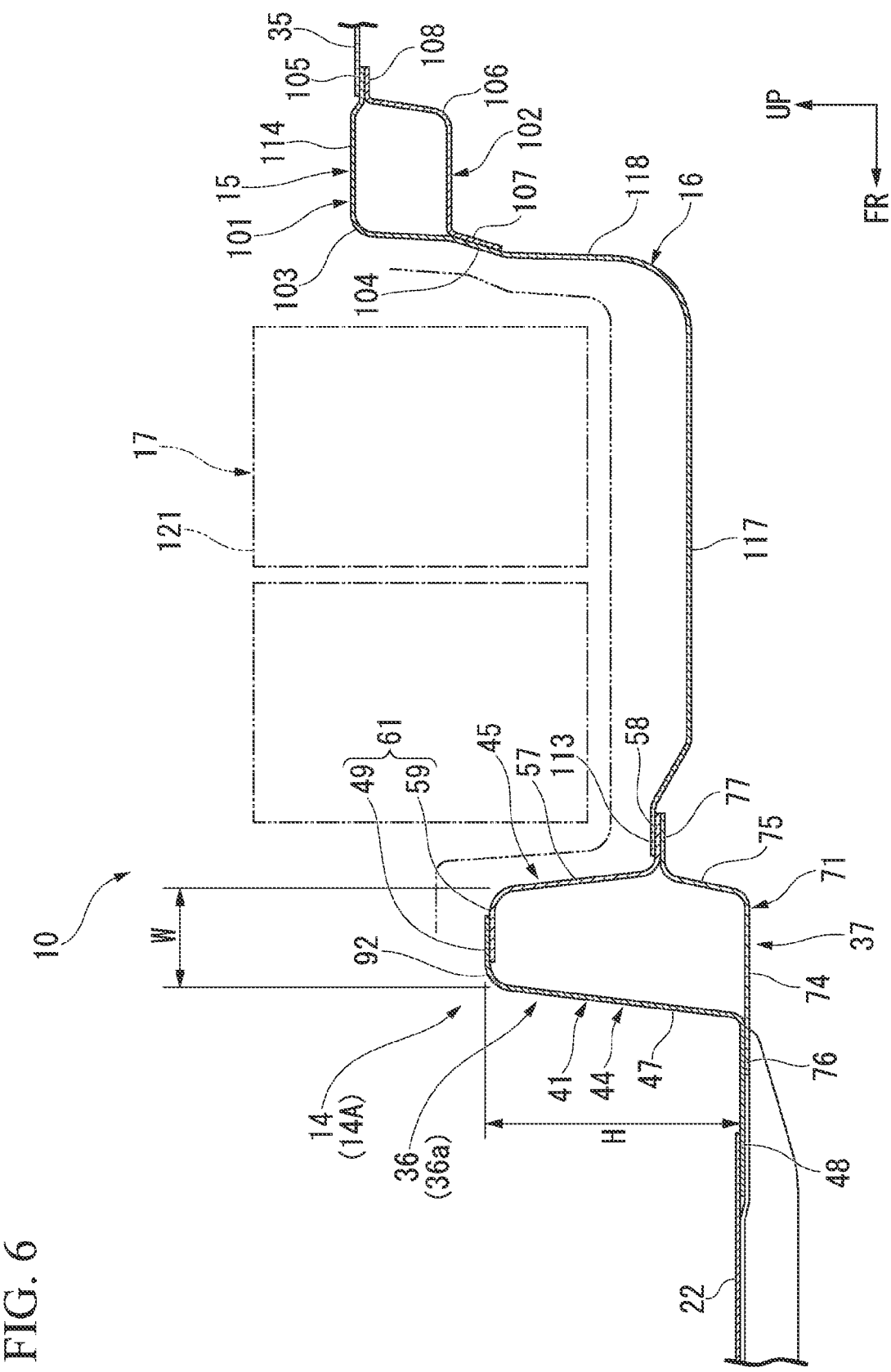
FIG. 6 is a cross-sectional view cut along line VI-VI in FIG. 2.
Figure 7:
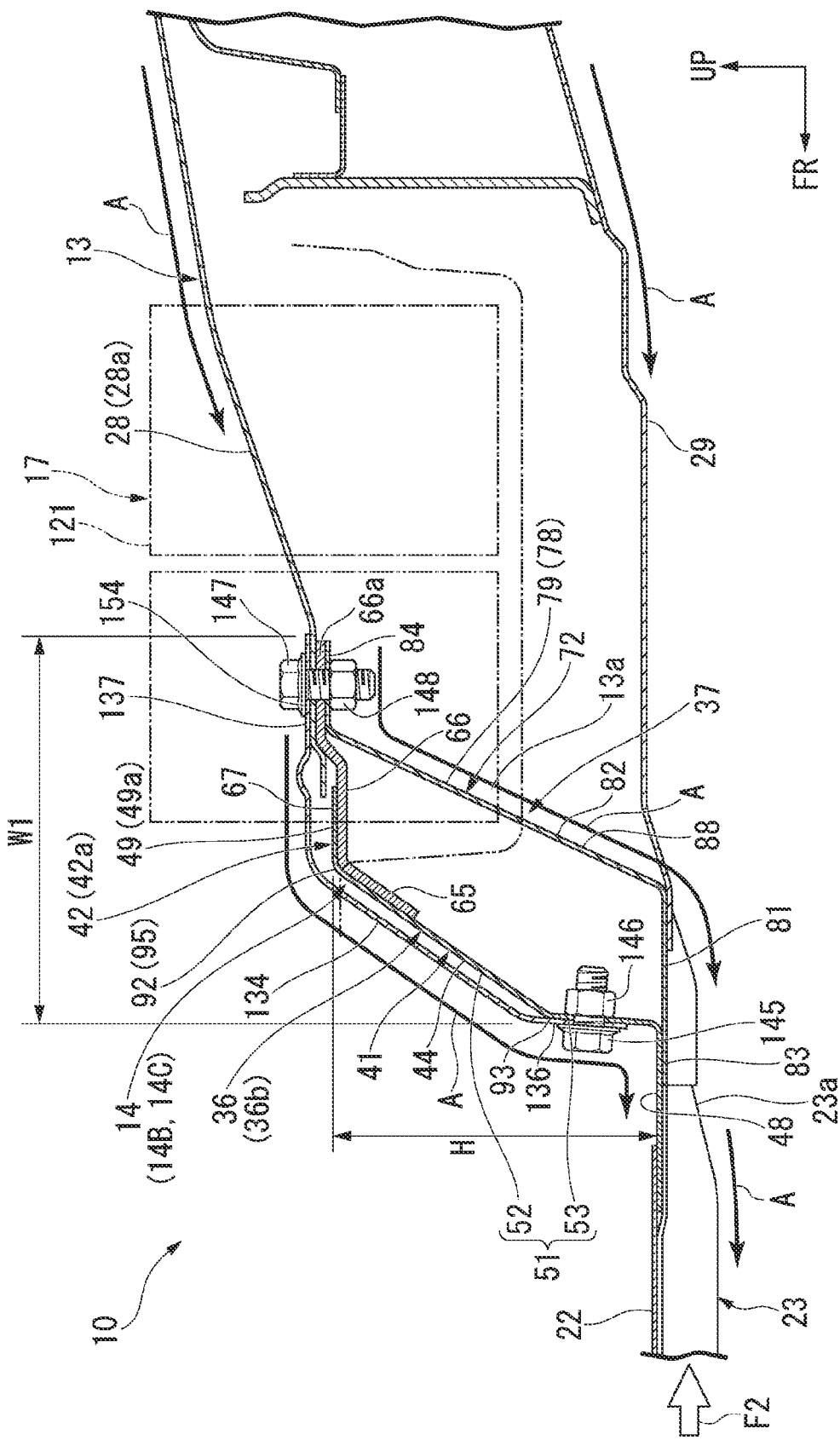
FIG. 7 is a cross-sectional view cut along line VII-VII in FIG. 2.

As illustrated in FIGS. 3, 6, and 7, the first floor cross member 14 includes a first upper member (upper cross member) 36 and a first lower member (lower cross member) 37 which is disposed below the first upper member 36. The first upper member 36 forms the upper portion of the first floor cross member 14. The first lower member 37 is connected to the first upper member 36 and forms a lower portion of the first floor cross member 14.

<First Upper Member>

The first upper member 36 includes an upper main body 41 and a stiffener 42 (also refer to FIG. 9) which is provided on the outward side of the upper main body 41 in the vehicle width direction. The upper main body 41 forms a main portion of the first upper member 36. The upper main body 41 includes a first upper body portion 44 and a second upper body portion 45 which is provided behind the first upper body portion 44 in the vehicle. The first upper body portion 44 has an upper front wall 47, a first upper flange 48 which is provided in the lower portion of the upper front wall 47, and a first apex portion flange 49 which is provided in the upper portion of the upper front wall 47.

The upper front wall 47 stands upward with respect to the front floor panel 22. In addition, the upper front wall 47 extends in the vehicle width direction and is laid across the rear end portion 12a of the left side sill 12 and the rear end portion 12a of the right-side sill 12 (refer to FIG. 2). The first upper flange 48 is formed toward the front side of the vehicle from a lower side of the upper front wall 47 and is connected to the front floor panel 22 from below. The first apex portion flange 49 is formed toward the rear side of the vehicle from an upper side of the upper front wall 47.

That is, the first upper body portion 44 is formed to have a crank-shaped cross section by the upper front wall 47, the first upper flange 48, and the first apex portion flange 49.

Figure 8:
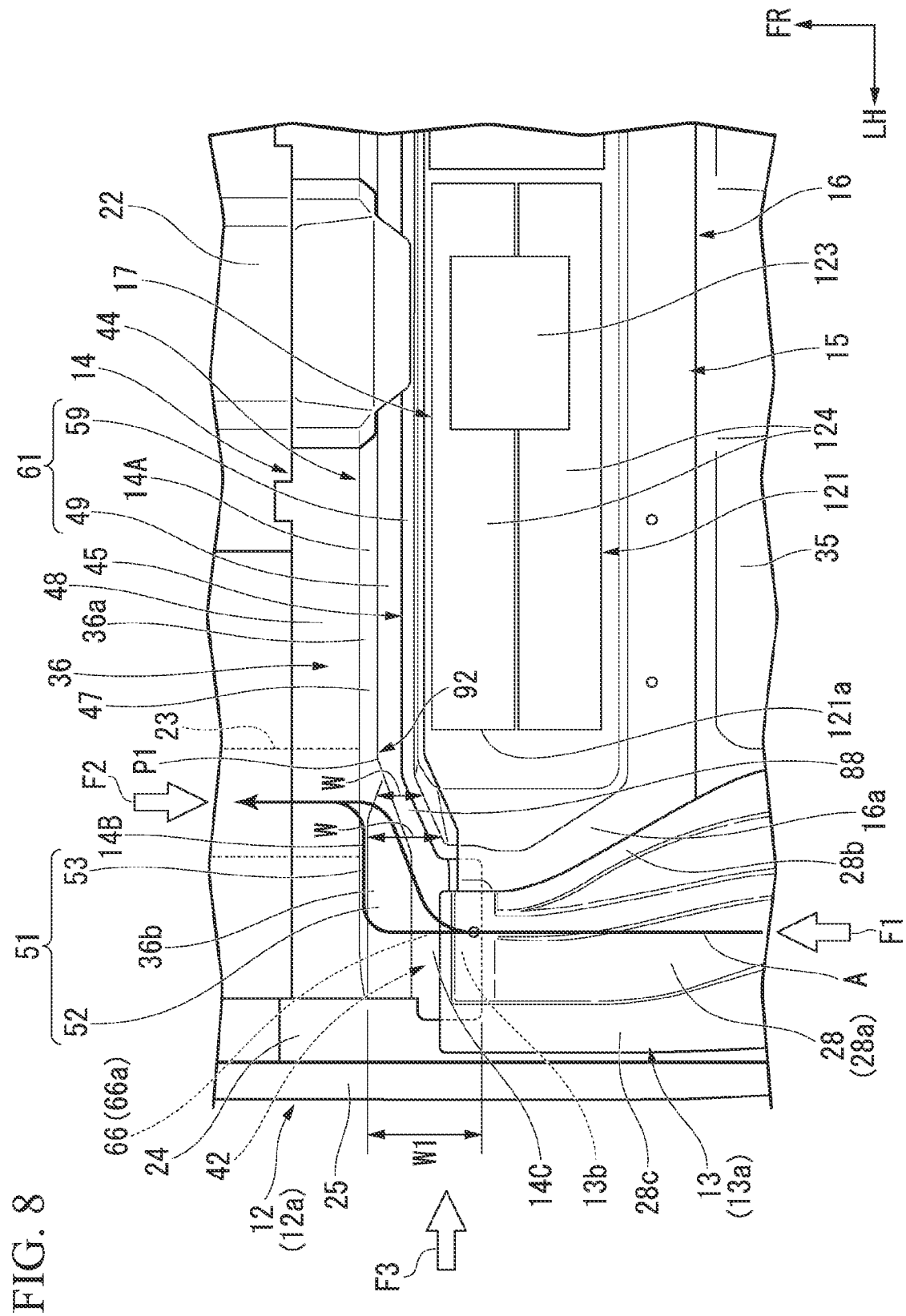
FIG. 8 is an enlarged plan view of the VIII part in FIG. 2.

As illustrated in FIGS. 7 and 8, the upper front wall 47 has upper front wall outer end portions 51 in a left outer end portion and a right outer end portion in the vehicle width direction. Each of the upper front wall outer end portions 51 has an inclined wall 52 and a part 53 below the inclined wall 52. Hereinafter, the part 53 below the inclined wall 52 in the upper front wall 47 may also be referred to as "an outer front wall 53". The inclined wall 52 is inclined upward from an upper side of the outer front wall 53 toward the rear side of the vehicle.

As illustrated in FIGS. 6 and 8, the second upper body portion 45 is provided along the first upper body portion 44 behind the first upper body portion 44 in the vehicle. The second upper body portion 45 has an upper rear wall 57, a second upper flange 58, and a second apex portion flange 59.

The upper rear wall 57 is disposed on the rear side of the vehicle with a gap with respect to the upper front wall 47.

The upper rear wall 57 extends in the vehicle width direction and is connected to extension portions 72 (which will be described below with FIGS. 3 and 7) on the left outward side in the vehicle width direction and the right outward side in the vehicle width direction.

The second upper flange 58 is formed toward the rear side of the vehicle from a lower side of the upper rear wall 57. The second apex portion flange 59 is formed toward the front side of the vehicle from an upper side of the upper rear wall 57.

That is, the second upper body portion 45 is formed to have a crank-shaped cross section by the upper rear wall 57, the second upper flange 58, and the second apex portion flange 59.

In the second upper body portion 45, the second apex portion flange 59 is connected to the first apex portion flange 49 from below. As a result, an upper apex portion 61 of the upper main body 41 is formed by the first apex portion flange 49 and the second apex portion flange 59.

That is, the upper main body 41 is formed to have substantially a hat-shaped cross section by the upper front wall 47, the upper rear wall 57, the upper apex portion 61, the first upper flange 48, and the second upper flange 58.

Figure 9:
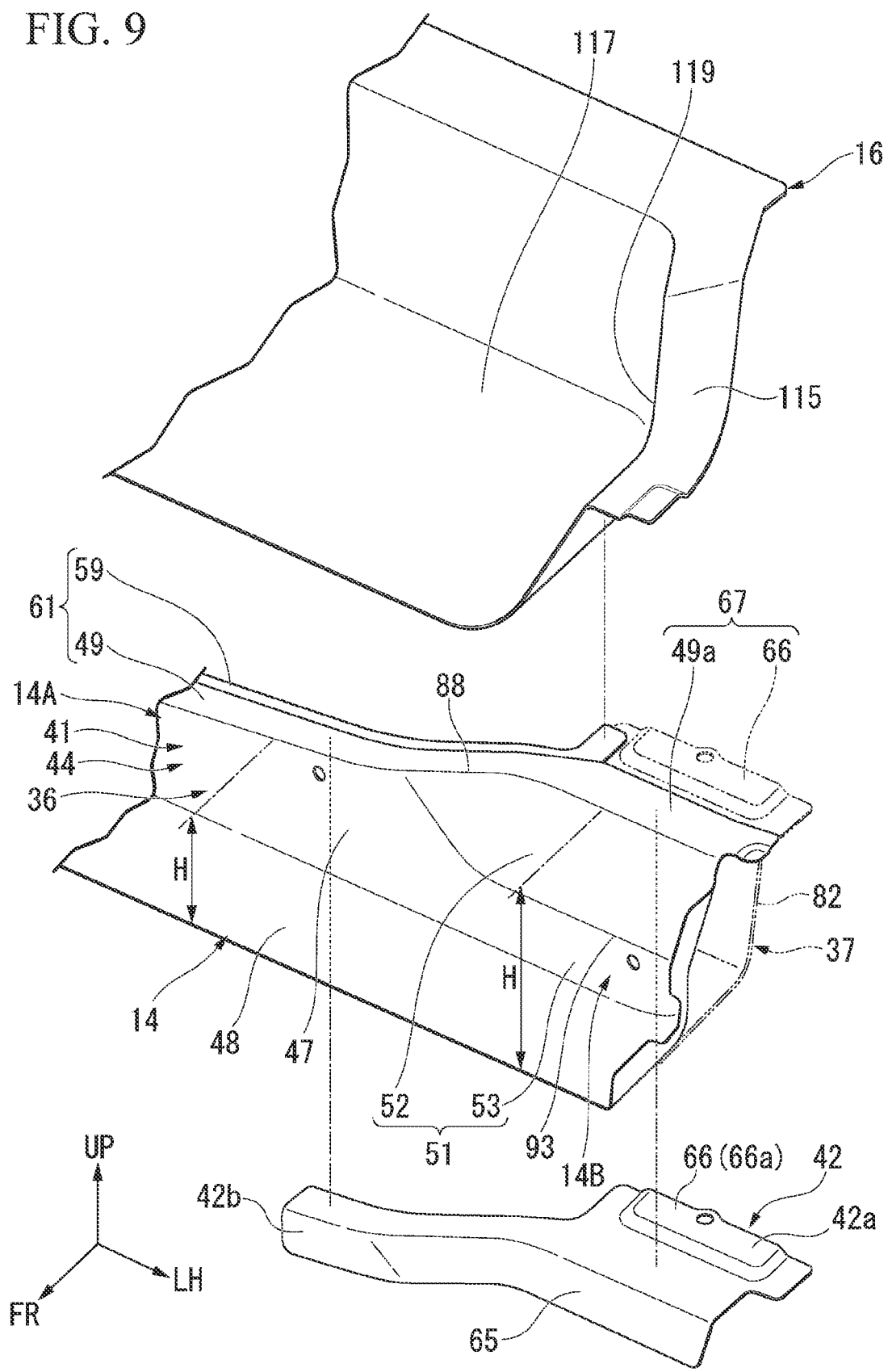
FIG. 9 is an exploded perspective view of a first floor cross member and a battery accommodation portion in the disassembled vehicle body lower structure according to the embodiment of the present invention.

As illustrated in FIGS. 7 to 9, the stiffener 42 is connected to a left end portion and a right end portion on the outward sides in the vehicle width direction in the first upper body portion 44 (specifically, an outer end portion of the upper front wall 47 and an outer end portion of the first apex portion flange 49). That is, in the first upper member 36, an end portion upper surface on the outward side in the vehicle width direction is formed by the stiffener 42 which is formed separately from the upper main body 41. The outer end portion of the upper front wall 47 includes the inclined wall 52.

The stiffener 42 has a first stiffener portion 65 and a second stiffener portion 66 which is provided in the upper portion of the first stiffener portion 65. The first stiffener portion 65 is connected from the rear side of the vehicle along the upper portion of the outer end portion in the upper front wall 47. The second stiffener portion 66 is formed toward the rear side of the vehicle from an upper side of the first stiffener portion 65 and is connected to the outer end portion of the first apex portion flange 49 from below.

In this manner, the stiffener 42 forms an end portion upper surface portion (end portion upper surface) in the first upper member 36 by being connected to the upper portion of the outer end portion in the upper front wall 47 and the outer end portion of the first apex portion flange 49. For example, the stiffener 42 is set to have higher strength and rigidity than the upper main body 41 by being formed to have a larger plate thickness than the upper main body 41 or using a material having higher strength and rigidity than the upper main body 41. Moreover, in the stiffener 42, the first stiffener portion 65 and the second stiffener portion 66 are formed to have a V-shaped cross section. Thus, the stiffener 42 is set to have far higher strength and rigidity.

Here, in the second stiffener portion 66, a stiffener rear end portion 66a on the rear side of the vehicle in the outer end portion on the outward side in the vehicle width direction protrudes to the rear side of the vehicle from an outer end portion 49a of the first apex portion flange 49.

An upper apex portion outer end portion 67 of the first upper member 36 is formed such that it leads to toward the outward side in the vehicle width direction from the upper apex portion 61 by the outer end portion 49a of the first apex portion flange 49 and the second stiffener portion 66.

<First Lower Member>

As illustrated in FIGS. 3, 6, and 7, the first lower member 37 includes a lower central portion 71 and the extension portions 72 which are provided at both ends of the lower central portion 71 in the vehicle width direction. The lower central portion 71 is a member formed separately from the extension portions 72 and forms a central portion of the first lower member 37 in the vehicle width direction. The lower central portion 71 is connected to a central portion 36a of the first upper member 36 in the vehicle width direction (hereinafter, it may also be referred to as an upper central portion 36a) from below.

Specifically, the lower central portion 71 has a central bottom portion 74 which is provided in the lower portion of the upper central portion 36a, a central rear wall 75 which is provided behind the central bottom portion 74 in the vehicle, a first central flange 76 which is provided in front of the central bottom portion 74 in the vehicle, and a second central flange 77 which is provided in the upper portion of the central rear wall 75.

The upper central portion 36a is disposed between an upper end portion 36b on the left outward side in the vehicle width direction (outward side in the vehicle width direction) and the upper end portion 36b on the right outward side in the vehicle width direction (outward side in the vehicle width direction) of the first upper member 36 in the vehicle width direction and is formed such that it leads to each of the upper end portions 36b.

The central bottom portion 74 is disposed below the upper front wall 47 in the upper central portion 36a and at a position facing the upper apex portion 61. The central rear wall 75 stands upward from a rear side of the central bottom portion 74 and is disposed on the rear side of the vehicle with a gap with respect to the upper front wall 47. The first central flange 76 protrudes to the front side of the vehicle from a front side of the central bottom portion 74. The second central flange 77 is formed toward the rear side of the vehicle from an upper side of the central rear wall 75.

That is, the lower central portion 71 is formed to have a crank-shaped cross section by the central bottom portion 74, the central rear wall 75, the first central flange 76, and the second central flange 77.

In the lower central portion 71, the first central flange 76 is connected to the first upper flange 48 of the upper central portion 36a from below. Moreover, the second central flange 77 is connected to the second upper flange 58 of the upper central portion 36a from below.

Accordingly, a central portion 14A of the first-floor cross member 14 in the vehicle width direction (hereinafter, it may also be referred to as a cross central portion 14A) is formed to have a rectangular closed cross section by the upper central portion 36a and the lower central portion 71.

The extension portions 72 are connected to a left end portion (end portion) and a right end portion (end portion) of the lower central portion 71 in the vehicle width direction. The extension portions 72 form a left lower end portion (lower end portion) and a right lower end portion (lower end portion) of the first lower member 37 in the vehicle width direction.

Each of the extension portions 72 has an extension bottom portion 81 which is provided in the lower portion of the upper front wall outer end portion 51, an extension rear wall 82 which is provided behind the extension bottom portion 81 in the vehicle, a first extension flange 83 which is provided in front of the extension bottom portion 81 in the vehicle, and a second extension flange 84 which is provided in the upper portion of the extension rear wall 82.

The extension bottom portion 81 is disposed below the upper front wall outer end portion 51 (that is, the inclined wall 52 and the outer front wall 53) and at a position offset (displaced) to the front side of the vehicle with respect to the upper apex portion outer end portion 67. The extension rear wall 82 stands in a state of being inclined upward from a rear side of the extension bottom portion 81 toward the rear side of the vehicle.

The extension rear wall 82 is disposed on the rear side of the vehicle with a gap with respect to the upper front wall outer end portion 51 positioned on the front side of the vehicle. The first extension flange 83 is formed toward the front side of the vehicle from a front side of the extension bottom portion 81. The second extension flange 84 is formed toward the rear side of the vehicle from an upper side of the extension rear wall 82.

In each of the extension portions 72, the first extension flange 83 is connected to the first upper flange 48 of the upper end portion 36b from below. Moreover, in each of the extension portions 72, the second extension flange 84 is connected to the rear end portion of the upper apex portion outer end portion 67 (specifically, the second stiffener portion 66) from below.

For this reason, wide width portions 14B are formed to have rhombic closed cross sections in the end portion of the first-floor cross member 14 on the outward side in the vehicle width direction (specifically, the left outer end portion and the right outer end portion) by the upper front wall outer end portions 51, the upper apex portion outer end portion 67, and the extension portions 72.

<Wide Width Portion>

Here, the upper front wall outer end portion 51 and the upper apex portion outer end portion 67 form the upper end portion 36b of the first upper member 36 on the outward side in the vehicle width direction. In addition, the extension portion 72 forms the lower end portion of the first lower member 37 on the outward side in the vehicle width direction.

That is, the wide width portion 14B is formed by the upper end portion 36b and the extension portion 72 which are connected to each other on the outward side of the first-floor cross member 14 in the vehicle width direction.

In addition, the wide width portion 14B includes a wide width closed cross section portion 79 by being formed to have a rhombic closed cross section. Moreover, the inclined wall 52 of the upper front wall outer end portion 51 is inclined upward toward the rear side of the vehicle. In addition, the extension rear wall 82 of the extension portion 72 stands in a state of being inclined upward toward the rear side of the vehicle. Thus, the wide width closed cross section portion 79 of the wide width portion 14B is formed to have a closed cross section inclined to the rear side of the vehicle upward (vehicle upward direction) in a side view.

As illustrated in FIGS. 2 and 5, the wide width portions 14B are formed such that they lead to the left end portion (end portion) and the right end portion (end portion) of the cross central portion 14A in the vehicle width direction. The first-floor cross member 14 is formed by the wide width portion 14B on the left side, the wide width portion 14B on the right side, and the cross central portion 14A. That is, the first-floor cross member 14 includes the wide width portion 14B on the left side, the wide width portion 14B on the right side, and the cross central portion 14A.

In this manner, the first-floor cross member 14 is formed to have a rectangular closed cross section which continues in the vehicle width direction by the wide width portion 14B on the left side, the wide width portion 14B on the right side, and the cross central portion 14A (in other words, the first upper member 36 and the first lower member 37). The first-floor cross member 14 includes a first closed cross section portion 78 which is formed to have a rectangular closed cross section, constitutes the vehicle body skeleton, and has high strength and rigidity. The first closed cross section portion 78 includes the wide width closed cross section portion 79 on the outward side in the vehicle width direction.

As illustrated in FIGS. 8 and 9, the first-floor cross member 14 is formed to have a height H (also refer to FIGS. 6 and 7) which increases upward (above the vehicle) toward the outward side in the vehicle width direction, and the wide width portions 14B are set to be the highest.

In addition, for example, the wide width portion 14B is provided toward the outward side in the vehicle width direction from a wide width position P1 overlapping the battery module 121 (which will be described below) in the vehicle forward-rearward direction, and a longitudinal width W in the vehicle forward-rearward direction (also refer to FIG. 6) is wider than the cross central portion 14A.

Moreover, the wide width portion 14B includes a part 14C overlapping a front end 13b of the rear side frame 13 in the vehicle width direction (hereinafter, it may also be referred to as a wide width overlapping portion 14C). That is, the wide width overlapping portion 14C is part of the wide width portion 14B positioned on the outward side in the vehicle width direction. The wide width overlapping portion 14C is set to have the largest (widest) longitudinal width W1 (also refer to FIG. 7) in the vehicle forward-rearward direction in the wide width portion 14B (that is, the first-floor cross member 14).

As illustrated in FIGS. 3 and 8, first inclined portions (inclined portions) 88 and second inclined portions (inclined portions) 89 are provided. The first inclined portions 88 are formed between the outer end portions of the cross central portion 14A (that is, the wide width positions P1) and the wide width overlapping portions 14C on the outward sides in the vehicle width direction. For example, the first inclined portion 88 includes a ridge line formed at a part on the inward side in the vehicle width direction in a projecting intersecting portion between the inclined wall 52 of the upper front wall 47 and the outer end portion 49a of the first apex portion flange 49. The first inclined portion 88 is inclined to the rear side of the vehicle toward the wide width overlapping portion 14C on the outward side in the vehicle width direction from the wide width position P1.

In addition, similar to the first inclined portion 88, the second inclined portion 89 is also formed between the outer end portion of the cross central portion 14A (that is, the wide width position P1) and the wide width overlapping portion 14C on the outward side in the vehicle width direction. For example, the second inclined portion 89 includes a part on the inward side in the vehicle width direction in a recessed intersecting portion between the second extension flange 84 of the extension portion 72 and the extension rear wall 82.

The second inclined portion 89 is inclined to the rear side of the vehicle toward the wide width overlapping portion 14C on the outward side in the vehicle width direction from the wide width position P1.

As illustrated in FIGS. 3 and 7, the frame front end portion 13a of the rear side frame 13 is connected to the extension rear wall 82 of the wide width portion 14B in an abutting state. Here, the first-floor cross member 14 is formed in the first closed cross section portion 78 extending in the vehicle width direction.

The first closed cross section portion 78 includes the wide width closed cross section portion 79 on the outward side in the vehicle width direction. In addition, the rear side frame is formed in the second closed cross section portion 29 extending in the vehicle forward-rearward direction.

That is, the second closed cross section portion 29 of the rear side frame 13 extends in the vehicle forward-rearward direction in a state of abutting the wide width closed cross section portion 79 in the first closed cross section portion 78 of the first-floor cross member 14.

<Second Floor Cross Member>

As illustrated in FIGS. 2 to 4, the second-floor cross member 15 is disposed on the rear side of the vehicle with respect to the power storage device 17 including the battery module 121 (which will be described below) and the like. The second-floor cross member 15 extends in the vehicle width direction and is coupled to the left rear side frame 13 and the right rear side frame 13.

Specifically, the second-floor cross member 15 includes a second upper member 101 which forms the upper portion of this second floor cross member 15, and a second lower member 102 which forms the lower portion of the second floor cross member 15. The second upper member 101 also serves as an accommodation rear end portion 114 of the battery accommodation portion 16, which will be described below. The second lower member 102 is connected to the second upper member 101.

Specifically, as illustrated in FIG. 6, the second upper member 101 is formed to have an L-shaped cross section due to an upper corner portion 103 which is bent on the front side of the vehicle such that it protrudes upward.

The second lower member 102 is formed to have substantially an L-shaped cross section due to a lower corner portion 106 which is bent on the rear side of the vehicle such that it protrudes downward.

A lower end portion 104 of the second upper member 101 and a lower flange 107 of the second lower member 102 are connected to each other. In addition, a rear flange 105 of the second upper member 101 and a rear flange 108 of the second lower member 102 are connected to each other. Accordingly, the second-floor cross member 15 is formed to have a rectangular closed cross section by the second upper member 101 and the second lower member 102. The second-floor cross member 15 is a member constituting the vehicle body skeleton and having high strength and rigidity. A front-end portion of the rear floor panel 35 is connected to the rear flange 105 from above.

<Battery Accommodation Portion and Power Storage Device>

As illustrated in FIGS. 2 and 6, the battery accommodation portion 16 is surrounded by the first-floor cross member 14, the second floor cross member 15, the left rear side frame 13, and the right rear side frame 13. The power storage device 17 is accommodated in the battery accommodation portion 16.

For example, the power storage device 17 includes the battery module 121, a blower fan (not illustrated), a high-voltage junction board 122, an electronic control unit (ECU) 123, and the like. For example, the battery module 121 includes a plurality of battery units 124. For example, each of the battery units 124 is formed by stacking a plurality of battery cells (not illustrated) in the vehicle width direction. Hereinafter, the battery module 121 may also be abbreviated to "a battery 121".

<Battery Cover>

As illustrated in FIGS. 1 and 2, in the battery accommodation portion 16, an opening portion 16b is covered with the battery cover 18 from above. The battery cover 18 is a metal cover formed of a metal material such that the upper portion of the power storage device 17 is covered. The battery cover 18 is connected to the first-floor cross member 14 and the second floor cross member 15.

Specifically, the battery cover 18 has a cover main body 131 which is positioned in the upper portion of the power storage device 17, a front connection portion 132 which is provided at a vehicle front end of the cover main body 131, a rear connection portion 133 which is provided at a vehicle rear end of the cover main body 131, and left and right vehicle width outward connection portions 134 which are provided at both ends of the cover main body 131 in the vehicle width direction.

The left vehicle width outward connection portion 134 and the right vehicle width outward connection portion 134 are substantially bilaterally symmetrical parts. Thus, hereinafter, the left vehicle width outward connection portion 134 will be abbreviated to "a vehicle width outward connection portion 134" and described in detail, and description of the right vehicle width outward connection portion 134 will be omitted.

The cover main body 131 projects upward from the power storage device 17. The front connection portion 132 is fixed (connected) to the upper front wall 47 of the first-floor cross member 14 by being fastened using fastening members such as bolts 141 and nuts (not illustrated), for example.

The rear connection portion 133 is fixed (connected) to the second upper member 101 of the second-floor cross member 15 by being fastened using fastening members such as bolts 142 and nuts (not illustrated), for example.

As illustrated in FIGS. 1 and 7, the vehicle width outward connection portion 134 is formed in the left end portion of the cover main body 131 (that is, a cover outer end portion) on the left outward side in the vehicle width direction (outward side in the vehicle width direction). The vehicle width outward connection portion 134 is connected in a manner of straddling the inclined wall 52 in the vehicle forward-rearward direction.

The vehicle width outward connection portion 134 is fixed (connected) by fastening a front fixing portion 136 to a part positioned below the inclined wall 52 of the upper front wall 47 (that is, the outer front wall 53) using fastening members bolts 145 and nuts 146, for example.

In addition, the vehicle width outward connection portion 134 is fixed (connected) by fastening a rear fixing portion 137 to the upper frame front end portion 28a, the stiffener rear end portion 66a, and the second extension flange 84 using fastening members such as bolts 147 and nuts 148, for example.

<Front Floor Frame>

Figure 10:
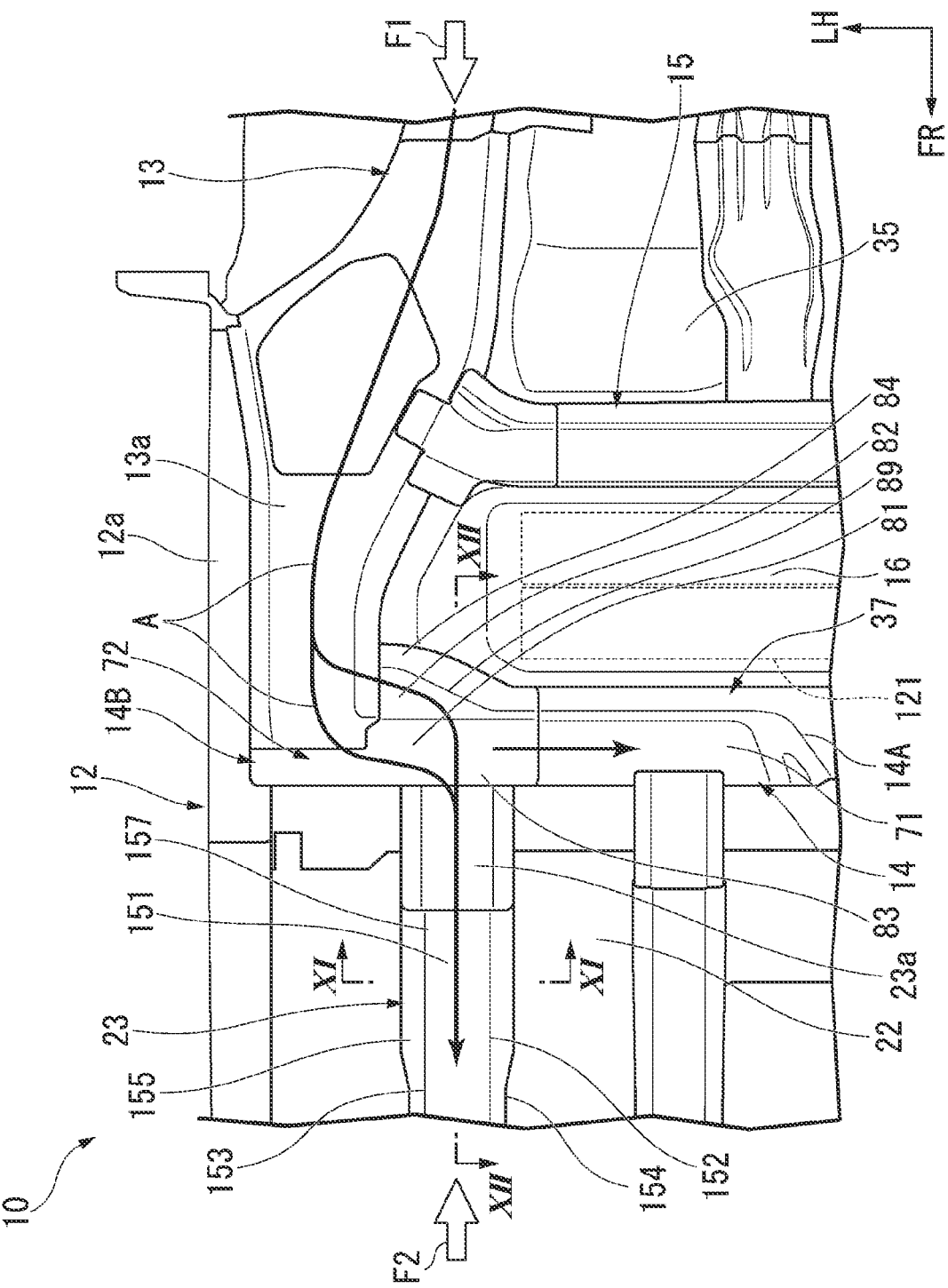
FIG. 10 is a bottom view illustrating a lower portion of a vehicle body on the left side in the vehicle body lower structure according to the embodiment of the present invention.
Figure 11:
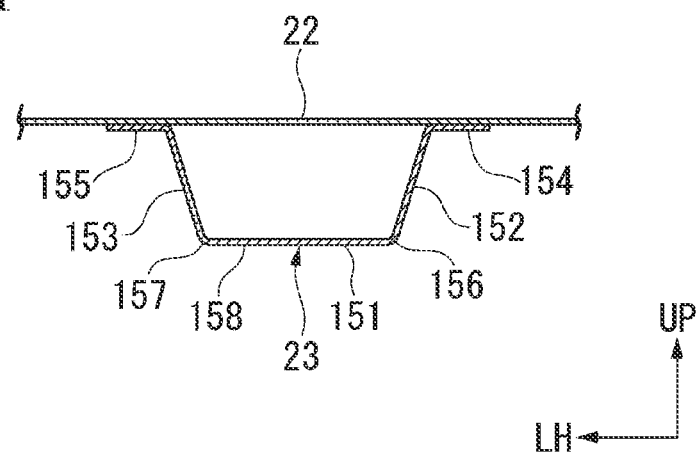
FIG. 11 is a cross-sectional view cut along line XI-XI in FIG. 10.

As illustrated in FIGS. 3, 10, and 11, the left and right front floor frames 23 are connected to the front floor panel 22 from below. Each of the front floor frames 23 is provided at a position near to the side of the side sill 12 in the vehicle width direction and extends in the vehicle forward-rearward direction. The front floor frame 23 forms a closed cross section together with the front floor panel 22 by being connected from below the front floor panel 22.

Specifically, the front floor frame 23 has a frame bottom portion 151 which is disposed below with a gap with respect to the front floor panel 22, a frame inner wall 152 and a frame outer wall 153 which are coupled to the frame bottom portion 151, a frame inner flange 154 which is coupled to the frame inner wall 152, and a frame outer flange 155 which is coupled to the frame outer wall 153.

The frame bottom portion 151 extends in the vehicle forward-rearward direction along the front floor panel 22. The frame inner wall 152 is formed from an inner side of the frame bottom portion 151 toward the front floor panel 22. The frame outer wall 153 is formed from an outer side of the frame bottom portion 151 toward the front floor panel 22. The frame inner flange 154 is formed from an upper side of the frame inner wall 152 toward the inward side in the vehicle width direction along the front floor panel 22. The frame outer flange 155 is formed from an upper side of the frame outer wall 153 toward the outward side in the vehicle width direction along the front floor panel 22. That is, the front floor frame 23 is formed to have a hat-shaped cross section by the frame bottom portion 151, the frame inner wall 152, the frame outer wall 153, the frame inner flange 154, and the frame outer flange 155. In addition, the front floor frame 23 formed to have a hat-shaped cross section has a first ridge line 156 and a second ridge line 157. The first ridge line 156 is formed by the intersecting portion between the frame bottom portion 151 and the frame inner wall 152. The second ridge line 157 is formed by the intersecting portion between the frame bottom portion 151 and the frame outer wall 153.

In the front floor frame 23, the frame inner flange 154 and the frame outer flange 155 are connected to the front floor panel 22 from below. Accordingly, for example, the front floor frame 23 is formed to have a rectangular closed cross section together with the front floor panel 22 and forms a third closed cross section portion 158 constituting the vehicle body skeleton and having high strength and rigidity.

Figure 12:
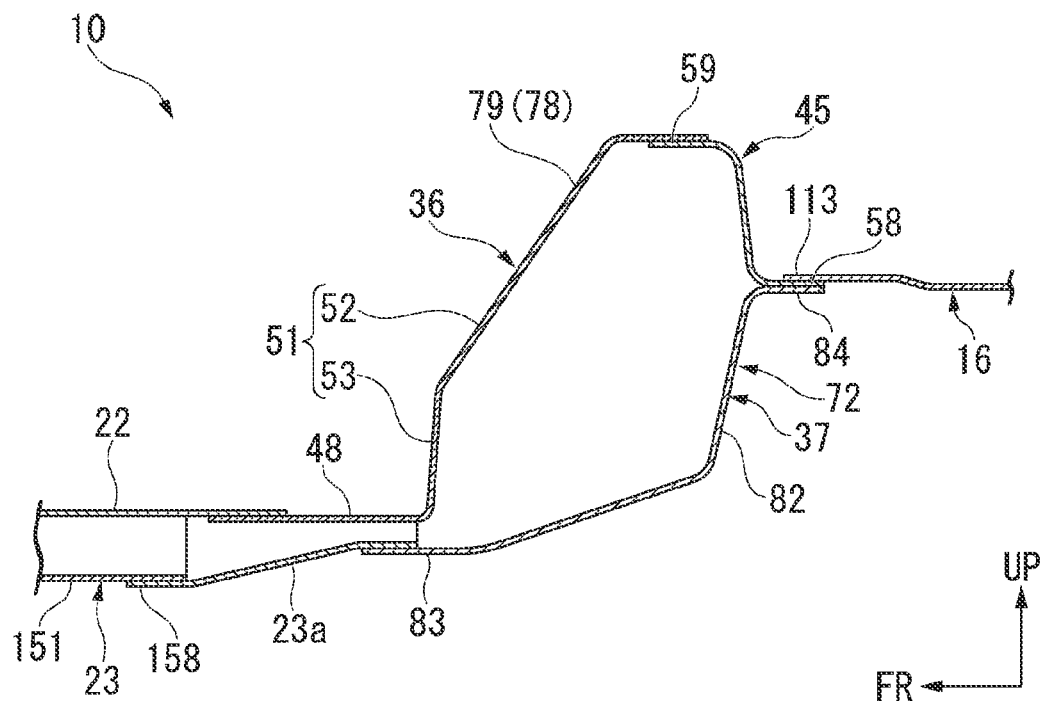
FIG. 12 is a cross-sectional view cut along line XII-XII in FIG. 10.

As illustrated in FIGS. 10 and 12, for example, in the front floor frame 23, the frame bottom portion 151 is formed to have a shape inclined upward toward the rear side of the vehicle in a frame rear end portion 23a on the rear side of the vehicle. In addition, for example, in the frame inner wall 152 and the frame outer wall 153, a lower side in the rear end portion is formed to be inclined upward toward the rear side of the vehicle along the frame bottom portion 151.

That is, for example, in the front floor frame 23, the frame rear end portion 23a is formed to have a tapered shape in which the frame bottom portion 151 is inclined upward toward the rear side of the vehicle. The frame rear end portion 23a formed to have a tapered shape is connected in a state of being sandwiched between the first upper flange 48 of the first upper member 36 and the first extension flange 83 of the first lower member 37 (specifically, the extension portion 72) in the upward-downward direction. In other words, the frame rear end portion 23a formed to have a tapered shape is connected in a state of being sandwiched between the first upper member 36 and the first lower member 37 in the upward-downward direction.

As illustrated in FIGS. 7 and 10, the frame rear end portion 23a formed to have a tapered shape is connected to the first extension flange 83 (that is, the extension portion 72). The frame front end portion 13a of the rear side frame 13 is connected to the extension rear wall 82 of the extension portion 72 in an abutting state. Accordingly, the frame front end portion 13a of the rear side frame 13 and the frame rear end portion 23a of the front floor frame 23 are coupled to the extension portion 72.

Here, the extension portion 72 forms part of the end portion of the first-floor cross member 14 on the outward side in the vehicle width direction (that is, the wide width portion 14B). For this reason, the rear side frame 13 is coupled (connected) to the end portion of the first-floor cross member 14 on the outward side in the vehicle width direction. In addition, the front floor frame 23 is also coupled (connected) to the end portion of the first-floor cross member 14 on the outward side in the vehicle width direction.

As illustrated in FIGS. 8 and 10, the front floor frame 23 is disposed at a position overlapping the first inclined portion 88 and the second inclined portion 89 of the wide width portion 14B in the vehicle width direction when viewed in the vehicle forward-rearward direction. Particularly, the first ridge line 156 and the second ridge line 157 of the front floor frame 23 are disposed at positions overlapping the first inclined portion 88 and the second inclined portion 89.

Moreover, the front floor frame 23 is disposed on the outward side of the battery 121 in the vehicle width direction.

As described above, according to the vehicle body lower structure 10 of the embodiment, the following operations and effects can be achieved. Hereinafter, a constitution of a vehicle body on the left side will be described in detail, and detailed description of the constitution on the right side will be omitted.

As illustrated in FIGS. 2, 3, and 10, the first-floor cross member 14 is disposed in front of the battery 121 in the vehicle. In addition, the rear side frame 13 connected to the end portion of the first-floor cross member 14 on the outward side in the vehicle width direction (the wide width portion 14B) is disposed on the outward side of the battery 121 in the vehicle width direction. Thus, the battery accommodation portion 16 is surrounded by the first-floor cross member 14 and the rear side frame 13, and the battery 121 is accommodated in the battery accommodation portion 16.

In addition, the front floor panel 22 is provided in front of the first-floor cross member 14 in the vehicle.

Moreover, the front floor frame 23 forming a closed cross section together with the front floor panel 22 is provided in front of the first-floor cross member 14 in the vehicle. Furthermore, the frame rear end portion 23a of the front floor frame 23 is connected to the end portion of the first-floor cross member 14 on the outward side in the vehicle width direction (that is, the wide width portion 14B). Here, the frame front end portion 13a of the rear side frame 13 surrounding the battery accommodation portion 16 is also connected to the end portion of the first-floor cross member 14 on the outward side in the vehicle width direction (the wide width portion 14B).

For this reason, for example, a rear collision load (collision load) F1 input to the rear side frame 13 due to a rear collision can be transferred to the front floor frame 23 as indicated by the arrow A via the wide width portion 14B of the first-floor cross member 14. In addition, for example, a front collision load (collision load) F2 input to the front floor frame 23 due to a front collision can be transferred to the rear side frame 13 in a direction opposite to the arrow A via the wide width portion 14B of the first-floor cross member 14.

That is, the collision loads F1 and F2 input due to a collision in the vehicle forward-rearward direction can be smoothly transferred between the rear side frame 13 and the front floor frame 23 via the wide width portion 14B of the first-floor cross member 14.

Therefore, part of the collision loads F1 and F2 input due to a collision in the vehicle forward-rearward direction can be dispersed such that it is not input to the battery accommodation portion 16. Accordingly, the strength and the rigidity of the battery accommodation portion 16 against the collision loads F1 and F2 can be enhanced. For this reason, for example, deformation of the battery accommodation portion 16 due to the collision loads F1 and F2 input due to a collision in the vehicle forward-rearward direction can be curbed without reinforcing the battery accommodation portion 16 with a reinforcement member. As a result, the battery 121 can be protected by curbing damage to the battery 121 by the battery accommodation portion 16, and thus weight reduction of the vehicle body can be achieved.

In addition, the extension portion 72 of the wide width portion 14B is formed separately from the lower central portion 71 of the first lower member 37, and the front floor frame 23 and the rear side frame 13 are coupled to the extension portion 72 which is formed separately. Accordingly, the collision loads F1 and F2 input due to a collision in the vehicle forward-rearward direction can be smoothly transferred between the rear side frame 13 and the front floor frame 23 via the extension portion 72.

As illustrated in FIGS. 3, 7, and 12, the second closed cross section portion 29 of the rear side frame 13 abuts the first closed cross section portion 78 of the first-floor cross member 14 (specifically, the wide width closed cross section portion 79 of the wide width portion 14B). In addition, the frame rear end portion 23a of the front floor frame 23 is sandwiched between the first upper member 36 and the first lower member 37. Here, for example, the front floor frame 23 forms the third closed cross section portion 158 having a rectangular closed cross section together with the front floor panel 22.

For this reason, the third closed cross section portion 158 of the front floor frame 23 and the second closed cross section portion 29 of the rear side frame 13 can be continuously connected to each other via the wide width closed cross section portion 79 of the first-floor cross member 14. Accordingly, the collision loads F1 and F2 input due to a collision in the vehicle forward-rearward direction can be smoothly transferred between the rear side frame 13 and the front floor frame 23 via the wide width closed cross section portion 79 of the first-floor cross member 14.

As illustrated in FIGS. 7, 8, and 10, the wide width portion 14B of the first-floor cross member 14 (specifically, the wide width overlapping portion 14C) is formed to have the wide longitudinal width W1 with respect to the cross central portion 14A. Moreover, the first inclined portion 88 and the second inclined portion 89 of the wide width portion 14B are inclined to the rear side of the vehicle from the cross central portion 14A toward the outward side in the vehicle width direction.

For this reason, the collision loads F1 and F2 input due to a collision in the vehicle forward-rearward direction can be smoothly transferred between the rear side frame 13 and the front floor frame 23 in the direction of the arrow A or the direction opposite to the arrow A via the first inclined portion 88 and the second inclined portion 89. In addition, the rear collision load (collision load) F1 input due to a rear collision on the rear side of the vehicle can be smoothly transferred from the rear side frame 13 to the cross central portion 14A of the first-floor cross member 14 via the first inclined portion 88 and the second inclined portion 89 as indicated by the arrow B.

In addition, a large cross-sectional area of the wide width portion 14B can be secured by widely setting the longitudinal width W1 of the wide width portion 14B with respect to the cross central portion 14A. For this reason, an absorbed amount of collision energy due to the collision loads F1 and F2 can be increased by causing the wide width portion 14B to be suitably deformed due to the collision loads.

In this manner, the collision loads F1 and F2 input due to a collision in the vehicle forward-rearward direction can be smoothly transferred via the first inclined portion 88 and the second inclined portion 89. Moreover, the absorbed amount of collision energy can be increased by causing the wide width portion 14B to be suitably deformed. Accordingly, the battery 121 can be protected by curbing damage to the battery 121.

As illustrated in FIGS. 7 and 8, the wide width closed cross section portion 79 of the wide width portion 14B is inclined to the rear side of the vehicle in the vehicle upward direction. Accordingly, the collision loads F1 and F2 input due to a collision in the vehicle forward-rearward direction can be smoothly transferred between the rear side frame 13 and the front floor frame 23 via the wide width closed cross section portion 79 of the wide width portion 14B in the direction of the arrow A or the direction opposite to the arrow A.

In addition, the wide width closed cross section portion 79 of the wide width portion 14B can be suitably deformed to the front side of the vehicle due to the collision loads F1 and F2 input due to a collision in the vehicle forward-rearward direction by causing the wide width closed cross section portion 79 of the wide width portion 14B to be inclined. For this reason, the absorbed amount of collision energy can be increased.

In this manner, the collision loads F1 and F2 input due to a collision in the vehicle forward-rearward direction can be smoothly transferred via the wide width closed cross section portion 79. Moreover, the absorbed amount of collision energy can be increased by causing the wide width closed cross section portion 79 to be suitably deformed due to the input collision loads F1 and F2. Accordingly, the battery 121 can be protected by curbing damage to the battery 121.

As illustrated in FIGS. 3, 8, and 10, the front floor frame 23 is disposed at a position overlapping the first inclined portion 88 and the second inclined portion 89 in the vehicle width direction. Particularly, the first ridge line 156 and the second ridge line 157 of the front floor frame 23 are disposed at positions overlapping the first inclined portion 88 and the second inclined portion 89. The first ridge line 156 and the second ridge line 157 are parts having high strength and rigidity against a load in the vehicle forward-rearward direction.

For this reason, for example, the rear collision load (collision load) F1 input due to a rear collision on the rear side of the vehicle can be more smoothly transferred from the rear side frame 13 to the front floor frame 23 via the first inclined portion 88 and the second inclined portion 89 as indicated by the arrow A. In addition, for example, the front collision load (collision load) F2 input due to a front collision on the front side of the vehicle can be more smoothly transferred from the front floor frame 23 toward the rear side frame in the direction opposite to the arrow A via the inclined portion.

That is, the collision loads F1 and F2 input due to a collision in the vehicle forward-rearward direction can be more smoothly transferred between the rear side frame 13 and the front floor frame 23 via the first inclined portion 88 and the second inclined portion 89.

Accordingly, the strength and the rigidity of the battery accommodation portion 16 against the collision loads F1 and F2 can be enhanced, and deformation of the battery accommodation portion 16 due to the collision loads F1 and F2 input due to a collision in the vehicle forward-rearward direction can be curbed. Therefore, the battery 121 can be protected by curbing damage to the battery 121 by the battery accommodation portion 16.

The front floor frame 23 is disposed on the outward side of the battery 121 in the vehicle width direction. For this reason, the front floor frame 23 can be located close to the rear side frames 13 in the vehicle width direction. Accordingly, the collision loads F1 and F2 input due to a collision in the vehicle forward-rearward direction can be more smoothly transferred between the rear side frame 13 and the front floor frame 23.

In addition, the front floor frame 23 can be disposed at a position not overlapping the battery 121 in the vehicle width direction by disposing the front floor frame 23 on the outward side of the battery 121 in the vehicle width direction. For this reason, the collision loads F1 and F2 input due to a collision in the vehicle forward-rearward direction can be smoothly transferred between the rear side frame 13 and the front floor frame 23 at a position not overlapping the battery 121.

Accordingly, deformation of the battery accommodation portion 16 can be more favorably curbed, and the battery 121 can be protected by curbing damage to the battery 121.

As illustrated in FIG. 8, the wide width overlapping portion 14C of the wide width portion 14B is disposed such that it overlaps the frame front end portion 13a of the rear side frame 13 in the vehicle width direction, and the wide width overlapping portion 14C is set to have the widest longitudinal width W1. For this reason, for example, the wide width overlapping portion 14C can be brought into contact with or located close to the rear side frame 13 in the vehicle forward-rearward direction.

Here, for example, it is conceivable that a load F3 be input from the outward side of the battery 121 in the vehicle width direction due to a lateral collision (hereinafter, it may also be referred to as a lateral load F3). In this case, bending (collapse) of the wide width portion 14B to the side of the frame front end portion 13a of the rear side frame 13 caused by the lateral load F3 input due to a lateral collision can be curbed by the rear side frame 13.

For this reason, the lateral load F3 can be efficiently transferred to the first-floor cross member 14, and the first floor cross member 14 can withstand the lateral load F3. Accordingly, deformation of the battery accommodation portion 16 due to the lateral load F3 can be more favorably curbed, and the battery 121 can be protected by curbing damage to the battery 121.

Moreover, for example, even when an excessive lateral load is input due to a lateral collision, collapse of the wide width portion 14B to the side of the rear side frame 13 due to a lateral load can be curbed by the rear side frame 13. For this reason, an excessive lateral load can be efficiently transferred to the first-floor cross member 14, and impact energy due to an excessive lateral load can also be absorbed by causing the wide width portion 14B (particularly, the wide width overlapping portion 14C) to be suitably deformed due to the excessive lateral load. Accordingly, deformation of the battery accommodation portion 16 due to an excessive lateral load can be curbed, and the battery 121 can be protected by curbing damage to the battery 121.

As illustrated in FIGS. 1 and 8, the battery cover 18 covering the upper portion of the battery 121 is formed of a metal. Since the battery cover 18 is formed of a metal, the strength and the rigidity of the battery cover 18 can be enhanced. This battery cover 18 is connected to the first-floor cross member 14 and the second floor cross member 15. For this reason, the first-floor cross member 14 and the second floor cross member 15 can be reinforced by the battery cover 18.

Accordingly, for example, it is possible to withstand the lateral load F3 input due to a lateral collision with the battery cover 18, the first-floor cross member 14, and the second floor cross member 15 by dispersing the lateral load F3 throughout each of the members. Therefore, deformation of the battery accommodation portion 16 due to the lateral load F3 can be more favorably curbed, and the battery 121 can be protected by curbing damage to the battery 121.

The technical scope of the present invention is not limited to the foregoing embodiment, and various changes can be added within a range not departing from the gist of the present invention.

Furthermore, it is possible to suitably replace the constituent elements according to the foregoing embodiment with known constituent elements within a range not departing from the gist of the present invention, and the foregoing modification examples may be suitably combined.

What is claimed is:

1. A vehicle body lower structure comprising:
   a front cross member that is disposed in front of a battery in a vehicle; and
   a rear side frame that is connected to an end portion of the front cross member on an outward side in a vehicle width direction and is disposed on an outward side of the battery in the vehicle width direction,
   wherein the vehicle body lower structure comprises:
      a floor panel that is disposed in front of the front cross member in the vehicle; and
      a front floor frame that forms a closed cross section together with the floor panel and is coupled to the end portion of the front cross member on the outward side in the vehicle width direction.

2. The vehicle body lower structure according to claim 1, wherein the front cross member comprises
   an upper cross member which forms an upper portion of the front cross member, and
   a lower cross member which is connected to the upper cross member and forms a lower portion of the front cross member,
   wherein the lower cross member comprises
      a lower central portion which forms a central portion in the vehicle width direction, and
      an extension portion which is connected to an end portion of the lower central portion and forms a lower end portion on the outward side in the vehicle width direction, and
   wherein the rear side frame and the front floor frame are coupled to the extension portion.

3. The vehicle body lower structure according to claim 1,
   wherein the front cross member comprises a first closed cross section portion formed to have a closed cross section by an upper cross member which forms an upper portion of the front cross member and a lower cross member which is connected to the upper cross member and forms a lower portion of the front cross member,
   wherein the rear side frame comprises a second closed cross section portion which abuts the first closed cross section portion and is formed to have a closed cross section extending in a vehicle forward-rearward direction, and
   wherein the front floor frame is connected in a state of being sandwiched between the upper cross member and the lower cross member.

4. The vehicle body lower structure according to claim 2,
   wherein the front cross member comprises
      a cross central portion in which an upper central portion forming a central portion of the upper cross member in the vehicle width direction and the lower central portion are connected to each other, and
      a wide width portion in which an upper end portion on the outward side in the vehicle width direction formed in an end portion of the upper central portion and the extension portion are connected to each other, and
   wherein the wide width portion comprises an inclined portion which is formed to have a wider longitudinal width in a vehicle forward-rearward direction than a longitudinal width of the cross central portion and is inclined to a rear side of the vehicle from the cross central portion toward the outward side in the vehicle width direction.

5. The vehicle body lower structure according to claim 4, wherein the wide width portion comprises a wide width closed cross section portion which is formed to have a closed cross section inclined to a rear side of the vehicle in a vehicle upward direction in a side view.

6. The vehicle body lower structure according to claim 4, wherein the front floor frame is disposed at a position overlapping the inclined portion in the vehicle width direction when viewed in the vehicle forward-rearward direction.

7. The vehicle body lower structure according to claim 2, wherein the front floor frame is disposed on the outward side of the battery in the vehicle width direction.

8. The vehicle body lower structure according to claim 4, wherein the wide width portion comprises a wide width overlapping portion which overlaps the rear side frame in the vehicle width direction and is set to have the widest longitudinal width.

9. The vehicle body lower structure according to claim 2 comprising:
   a rear cross member that is disposed behind the battery and is coupled to the rear side frame; and
   a battery cover that is connected to the rear cross member and the front cross member and covers an upper portion of the battery,
   wherein the battery cover is formed of a metal.

* * * * *